US007472121B2

(12) United States Patent
Kothari et al.

(10) Patent No.: US 7,472,121 B2
(45) Date of Patent: Dec. 30, 2008

(54) DOCUMENT COMPARISON USING MULTIPLE SIMILARITY MEASURES

(75) Inventors: Ravi Kothari, New Delhi (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 11/304,029

(22) Filed: Dec. 15, 2005

(65) Prior Publication Data

US 2007/0143322 A1    Jun. 21, 2007

(51) Int. Cl.
 *G06F 17/30* (2006.01)
(52) U.S. Cl. .............................................. 707/6; 707/5
(58) Field of Classification Search ........................ None
See application file for complete search history.

(56) References Cited

U.S. PATENT DOCUMENTS

| 5,774,833 | A | 6/1998 | Newman |
| 6,556,992 | B1 | 4/2003 | Barney et al. |
| 2003/0004936 | A1 | 1/2003 | Grune et al. |
| 2003/0033295 | A1 | 2/2003 | Adler et al. |

OTHER PUBLICATIONS

J. Dean and M. Henzinger. Finding Related Pages in the World-Wide Web. In *Proceedings of the Eight International World-Wide Web Conference*, Toronto, Canada, May 1999.
P. Ganesan, H. Garcia-Molina, and J. Widom. Exploiting Hierarchical Domain Structure to Compute Similarity. *ACM Transactions on Information Systems*, 21(1):64{93, Jan. 2003.
V. Gillet, D. Wild, P. Willett, and J. Bradshaw. Similarity and Dissimilarity Measures for Processing Chemical Structure Databases. *The Computer Journal*, 41(8), 1998.
M. Halkidi, B. Nguyen, I. Varlamis, and M. Vazirgiannis. Thesus: Organizing Web Document Collections based on Link Semantics. *VLDB Journal*, 12(4), Nov. 2003.
N. Kando and M. Leong. Workshop on Patent Retrieval: SIGIR 2000 Workshop Report. *ACM SIGIR Forum*, 34(1):28{Apr. 30, 2000.
L. Larkey. A Patent Search and Classification System. In *the Proceedings of the ACM Digital Library Conference*, Berkeley, CA, 1999.
D. Lin. An Information-Theoretic Definition of Similarity. In *the Proceedings of the International Conference on Machine Learning*, pp. 296{304, San Francisco, Ca, 1998.
M. Marinescu, M. Markellou, G. Mayritsakis, K. Perdikuri, S. Sirmakessis, and A. Tsakalidis. Knowledge Discovery in Patent Databases. In *the Proceedings of the ACM Conference on Information and Knowledge Management*, McLean, Virginia, 2002.

(Continued)

*Primary Examiner*—Apu Mofiz
*Assistant Examiner*—Kavita Padmanabhan
(74) *Attorney, Agent, or Firm*—Gibb & Rahman, LLC

(57) ABSTRACT

Disclosed herein is a method for comparing documents. The method includes the steps of: determining a plurality of similarity measures; and determining an overall similarity measure for the plurality of documents, based on the plurality of similarity measures. In one embodiment, the similarity measures are chosen from the group of similarity measures consisting of semantic and reference similarity measures. When comparing documents from the chemical, biochemical or pharmaceutical domains, the determination of the similarity utilizes a determination of structural similarity of the chemical formulas described in the plurality of documents.

9 Claims, 6 Drawing Sheets

OTHER PUBLICATIONS

S. Mukherjea and B. Bamba. BioPatentMiner: An Information Retrieval System for BioMedical Patents, in *the Proceedings of the Very Large Databases (VLDB) Conference*, Toronto, Canada, 2004.

M. Osborn, T. Strzalknowski, and M. Marinescu. Evaluating Document Retrieval in Patent Database: a Preliminary Report. In *the Proceedings of the ACM Conference on Information and Knowledge Management*, Las Vegas, Nevada, 1997.

J. Pitkow and P. Pirolli. Life, Death and Lawfulness on the Electronic Frontier. In *Proceedings of the ACM SIGCHI '97 Conference on HumanFactor s in Computing Systems*, pp. 383{390, Atlanta, Ga, Mar. 1997.

P. Resnik. Using Information Content to Evaluate Semantic Similarity in a Taxonomy. In *the Proceedings of the International Joint Conference on Artificial Intelligence (IJCAI)*, pp. 448{453, 1995.

G. Salton, A. Wong and C.S.Yand. A Vector Space Model for Automatic Indexing in the *Communications of the ACM*, 18(11), Nov. 1975.

L. Subramaniam, S. Mukherjea, P. Kankar, B. Srivastava, V. Batra, P. Kamesam, and R. Kothari. Information Extraction from Biomedical Literature: Methodology, Evaluation and an Application. In *the Proceedings of the ACM Conference on Information and Knowledge Management*, New Orleans, Lousiana, 2003.

J. Chen et al. A Protein Patent Query System Powered by Klesli., *Proceedings of the ACM SIGMOD Conference*, Seattle, WA, 1998.

DOCUMENT COMPARISON USING MULTIPLE SIMILARITY MEASURES

FIELD OF THE INVENTION

The present invention relates generally to document searching and retrieval and, in particular, to a comparison of documents using multiple similarity measures.

BACKGROUND

There are many techniques for searching a database to retrieve relevant documents and publications in response to a query provided by a user. Searches are conducted for different reasons. Many searches are undertaken in an attempt to find material of interest for research and other purposes. A user conducting such a search may know of the existence of a desired document or publication, such as a book, and may be seeking to determine whether the database under investigation contains the desired document or publication, or other related documents. Alternatively, a user may construct a query of a database based on one or more keywords in an attempt to retrieve all records relating to an area of interest to the user.

The searching and retrieval of information from databases can also be used as a strategic tool to investigate and determine the activities of market competitors. Pharmaceutical companies are particularly interested in the activities of their competitors. There are large time and dollar costs associated with pharmaceutical research, so before committing resources to a particular area of interest, it is common for pharmaceutical companies to search industry and patent databases to determine what is presently known and understood in that particular area. Further, it is important to determine the nature and scope of technology in the field of interest that might be protected by patents or other intellectual property rights.

Patents provide a limited monopoly right to exploit an invention in a particular jurisdiction to the exclusion of all others, in exchange for providing an enabling disclosure of how the invention works. In the case of pharmaceutical companies, it is particularly important to determine which chemical compounds might be subject to patent protection before committing large resources to research in a given area. Without undertaking a relevant search of patent databases and the like, a company may invest large amounts of time and money to research a new drug, only to find that the drug is protected by a patent granted to a market competitor. However, searching industry and patent databases is difficult, as different publications may utilise different words or expressions in relation to the same subject matter. Thus, a query using a given keyword may not retrieve all relevant publications due to the variance that exists in technical jargon and terminology.

When investigating a particular field of interest, it is known to determine the similarity between two textual documents based on common keywords, as described, for example, in "*A Vector Space Model for Automatic Indexing*", Salton G., Wong, A. and Yang, C. S. Communications of the ACM, 18(11), November 1975. Returning to the example of pharmaceutical companies searching patent databases, it may not be appropriate to search for common words between two documents, as pharmaceutical patent documents typically contain many different chemical and biological terms.

Many jurisdictions provide patent databases that are able to be accessed from a remote computer terminal, typically via an Internet-based interface. For example, the records of the United States Patent and Trademark Office are able to be accessed via the Internet at the Uniform Resource Locator (URL) uspto.gov/patft/. Other patent databases are provided by, for example, the European Patent Office, the Australian Patent Office, and the Japanese Patent Office. Online patent databases typically allow traditional keyword based searches on various fields of a patent or patent application. The searchable fields can include, for example, the name of an inventor, assignee, and title. However, under some circumstances the simple keyword based searches are inadequate. For example, a scientist about to file a patent application for a new invention requires more complex retrieval techniques to identify existing patents and patent applications that are similar to the new invention. Further, a company seeking to identify relationships with a competitor based on their assigned patents also requires more complex retrieval techniques than those afforded by traditional keyword based search techniques.

Research systems that utilize different techniques for retrieving information from patent databases have been studied. For example, "*Evaluating Document Retrieval in Patent Database: a Preliminary Report*", M. Osborn et al., Proceedings of the ACM Conference on Information and Knowledge Management, Las Vegas, Nev., 1997 introduces a system that integrates a series of shallow natural language processing techniques into a vector based document information retrieval system for searching a subset of U.S. patents. Another study, "*A Patent Search and Classification System*", L. Larkey, Proceedings of the ACM Digital Library Conference, Berkeley, Calif., 1999 uses a probabilistic information retrieval system for searching and classifying U.S. patents. Another search system is described in "*Knowledge Discovery in Patent Databases*", M. Marinescu et al., Proceedings of the ACM Conference on Information and Knowledge Management, McLean, Va., 2002, which attempts to utilise techniques like Correspondence and Cluster analysis for mining patents. Some of the challenges in the domain of patent retrieval are discussed in "*Workshop on Patent Retrieval: SIGIR 2000 Workshop Report*", N. Kando et al., ACM SIGIR Forum, 34(1):28-30, Apr. 2000.

Traditionally, text-based documents are compared based on the number of similar terms among the documents under comparison. Such techniques may not be reliable, however, for some technical disciplines in which synonyms are frequently used or in emerging areas of technology for which standardised terms are yet to be determined. Such technical disciplines include, for example, the computer science and pharmaceutical domains. In the computer science domain, Enterprise Java Beans may also be referred to as EJB. Thus, EJB is a synonym for Enterprise Java Beans in the computer science domain. In the pharmaceutical domain, many biomedical concepts are known by a variety of names. Further, biological concepts may be related as a result of belonging to the same class. For example, the terms Amylase and Somatostatin are related, because both are proteins.

Another complication is that a group of molecules may be similar in respect of a nominal attribute or characteristic, even if the formulae for the respective molecules are different. In such circumstances, it is generally not possible to utilise string-based matching techniques on the formulae to identify those molecules that possess a desired attribute or characteristic. Further, a search of a database using a generic or commercial trade name for a chemical composition may not retrieve relevant documents in which the composition is only described with reference to its formulaic representation. For example, 7-CHLORO-1-METHYL-5-PHENYL-2H-1,4-BENZODIAZEPIN-2-ONE and 7-CHLORO-1-METHYL-5-PHENYL-3H-1,4-BENZODIAZEPIN-2(1H)-ONE are different formulations of Valium. Thus, a simple keyword search for the term "valium" might return documents relating to the first formulation, the second formulation, or neither formulation. One technique for querying protein patents is described in "A Protein Patent Query System Powered by Kleisli", J. Chen et al., Proceedings of the ACM SIGMOD Conference, Seattle, Wash., 1998. Given a protein sequence, Chen uses patent and protein databases, as well as bioinformatics tools, to identify whether similar protein sequences have already been patented.

Due to the complexities described above that exist in the pharmaceutical domain, it is known for pharmaceutical companies to employ one or more patent analysts, or to engage an external agency, to examine manually hundreds of patents retrieved by querying the patent databases. This is an expensive and time-consuming approach for searching patent databases and comparing the documents contained therein, and is subject to human error.

Thus, a need exists for an improved method of comparing two or more publications to determine the similarity of those documents.

SUMMARY

It is an object of the present invention to overcome substantially, or at least ameliorate, one or more disadvantages of existing arrangements.

The present disclosure provides a method for determining the similarity of two or more publications based on multiple similarity measures determined for those publications. The similarity measures can include, for example, semantic, structural, and reference similarity measures.

In an embodiment that employs a similarity measure, the method utilizes the number of common terms in the publications that are being compared to determine the similarity of those publications.

In another embodiment that employs a reference similarity measure, the method utilizes the references contained within the publications that are being compared to determine the similarity of those publications.

In a further embodiment that employs a semantic similarity measure, the method determines the similarity of terms contained within the publications by utilizing a domain-specific ontology. In so doing, terms that are synonyms are considered to be equivalent. In a further embodiment, in which the publications being compared contain chemical formulae, the similarity of the structural representations of those chemical formulae is utilized in determining the similarity of the publications.

In a yet further embodiment, documents from the chemical, biochemical or pharmaceutical domains are compared, and the determination of the semantic similarity utilizes a determination of structural similarity of the chemicals described in the plurality of documents.

According to a first aspect of the present disclosure, there is provided a method of comparing a plurality of documents, the method comprising the steps of: determining a plurality of similarity measures for the plurality of documents; and determining an overall similarity measure for the plurality of documents, based on the plurality of similarity measures.

According to a second aspect of the present disclosure, there is provided a computer program product having a computer readable medium having a computer program recorded therein for comparing documents. The computer program product comprises: computer program code means for determining a plurality of similarity measures for the plurality of documents; and computer program code means for determining an overall similarity measure for the plurality of documents, based on the plurality of similarity measures.

According to a third aspect of the present disclosure, there is provided a computer program product having a computer readable medium having a computer program recorded therein for comparing documents. The computer program product comprises: computer program code means for determining a reference similarity measure, based on references contained in the plurality of documents; computer program code means for determining a semantic similarity measure, based on the similarity of terms contained in the plurality of documents; and computer program code means for determining a similarity measure for the plurality of documents, based on the reference similarity measure and the semantic similarity measure.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
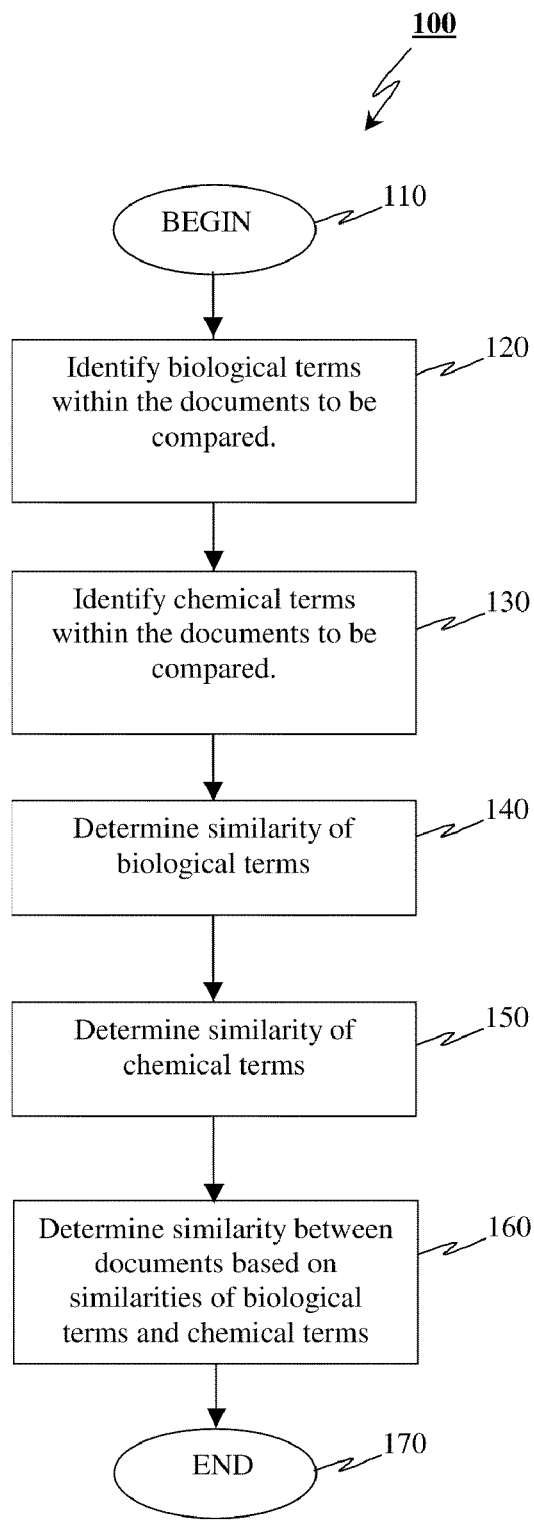
FIG. 1 is a flow diagram of a method of determining a semantic similarity measure for biomedical patent documents, in accordance with an embodiment of the present disclosure.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to document searching and retrieval. For ease of explanation, the steps of the preferred method are described with reference to a comparison of patents and patent documents. However, it is not intended that the present invention be limited to the described method. For example, the invention may have application to general database searches and comparisons of research materials.

Overview

Text-based documents are often compared based on the number of similar terms that are common between the documents under comparison. For example, the Vector Space Model (VSM) described in "A Vector Space Model for Automatic Indexing", Salton G., Wong, A. and Yang, C. S. Communications of the ACM, 18(11), November 1975, represents documents as vectors of terms $d_i=\{w_{i1}, w_{i2}, \ldots w_{in}\}$, where $w_{ik}$ (1<k<n) is a non-negative value denoting the weight of the term k in the document i. Generally, the weight is determined by Term Frequency-Inverse Document Frequency (TF-IDF), which is calculated as:

$$tf_{ik} \times \log_2 \frac{N}{n_k} \quad (1)$$

where $tf_{ik}$ is the frequency of the term k in the document i, N is the number of documents in a collection and $n_k$ is the number of documents in which the term k occurs at least once. The term $$\log_2 \frac{N}{n_k}$$

is the Inverse Document Frequency, which represents how common the term $n_k$ is in the document corpus.

The similarity between two documents represented by vectors di and dj is then given by the Cosine Similarity between the vectors, calculated as:

$$\frac{d_i \cdot d_j}{\sqrt{d_i \cdot d_i} \sqrt{d_j \cdot d_j}} \quad (2)$$

where $d_i \cdot d_j$ is the dot product between the vectors, calculated as $$\sum_{k=0}^{n} \sum_{l=0}^{n} w_{ik} \cdot w_{jl} \quad (3)$$

If $w_{ik}$ and $w_{jl}$ are the same terms, $w_{ik} \cdot w_{jl} = w_{ik} \times w_{jl}$.
If $w_{ik}$ and $w_{jl}$ are not the same, $w_{ik} \cdot w_{jl} = 0.0$.

A significant limitation of determining the similarity between documents based solely on common terms is that the semantic similarity between terms is not taken into account. In order to overcome this limitation, ontologies and taxonomies can be utilized to determine the similarity between terms. An ontology is a data structure containing all relevant entities, possible relationships between those entities, and associated rules for a nominal domain. An ontology is typically hierarchical in structure, but is not restricted to only hierarchical structures. A taxonomy may refer to either the classification of a group of objects, or principles underlying such classification. Taxonomies are frequently hierarchical in structure, but are not necessarily so. A taxonomy may be a simple organization of a group of objects, or even an alphabetical list. Examples of ontologies may be found, for example, at each of the following Internet websites: Gene Ontology (geneontology.org) and Suggested Upper Merged Ontology (SUMO) (ontologyportal.org).

"*THESUS: Organizing Web Document Collections based on Link Semantics*", M. Halkidi et al., VLDB Journal, 12(4), November 2003 utilizes similarity measures, based on an ontology, to cluster Web documents. Similarly, "*Exploiting Hierarchical Domain Structure to Compute Similarity*", P. Ganesan et al., ACM Transactions on Information Systems, 21(1):64-93, January 2003, discloses several similarity measures that have been developed utilizing taxonomies for comparing collections. One such measure is the Generalized Cosine Similarity Measure, which is similar to the Cosine Similarity Measure of the Vector Space Model described above. However, when determining the dot product between two vectors in the Generalized Cosine Similarity Measure, if two terms of the vectors representing the collections are not similar, the similarity between the two terms is not zero, as described above with reference to the VSM, but rather is determined by an ontology or taxonomy.

A related area of research is concerned with determining the similarity between terms in an ontology or taxonomy. One simple technique is to calculate the similarity based on the distance (number of edges) between two terms in an ontology graph. However, information-theoretic approaches for determining the similarity between ontology terms have been found to be most effective. For example, "*Using Information Content to Evaluate Semantic Similarity in a Taxonomy*", P. Resnik, Proceedings of the International Joint Conference on Artificial Intelligence (IJCAI), pages 448-453, 1995, proposes a method to determine the similarity between two semantic classes in a taxonomy based on the amount of information that the semantic classes share in common. Let $p_C$ be the probability of encountering a class C or a child of the term in the taxonomy. Although Resnik considered a child term by only considering is-$\alpha$ links, the approach can be extended to links of all types. $p_C$ is monotonic as one moves up the taxonomy and will approach 1 for the root. The principle of Information theory defines the information content of a term as $-\ln(p_C)$.

Given two classes Ck and Cl in the taxonomy, let $P_{min}$ be the minimum probability among common ancestors of the two classes. Since the amount of information shared by a term can be determined from the ancestor with the maximum information content, Resnik defined the similarity between the terms to be $-\ln(P_{min})$. The value of this metric can vary between 0, for very dissimilar terms, to infinity. "*An Information-Theoretic Definition of Similarity*", D. Lin, Proceedings of the International Conference on Machine Learning, pages 296-304, San Francisco, Calif., 1998, refined the similarity measure so that it varies between 0 and 1. Thus, the similarity between two ontology resources Ck and Cl is calculated to be:

$$sim(Ck, Cl) = \frac{2 \times [\ln(p_{min})]}{\ln(p_{Ck}) + \ln(p_{Cl})} \quad (4)$$

Various measures of similarity between pairs of chemical molecules have been proposed, as discussed for example in "*Similarity and Dissimilarity Measures for Processing Chemical Structure Databases*", V. Gillet et al., The Computer Journal, 41(8), 1998. One technique is to determine the similarity based on the "Molecular Fingerprints" of the chemicals. The molecular fingerprints contain information about atoms and substructures contained within a molecule. The fingerprints are represented as a boolean array, in which each element is TRUE (1) or FALSE (0). Boolean arrays in turn are usually represented as bitmaps, an array of bytes or words in which each bit represents one position of the boolean array. The procedure for constructing a fingerprint for a chemical, which is stored as a string of bits of length L, is as follows:

1. Set all L bits of the fingerprint initially to 0.
2. Assign to every substructure of the chemical, starting from each atom and extending down the bonds (including bond type) until the entire molecule is represented, a unique pattern described by a small number of positions along the fingerprint. Instead of allowing the chain length to increase until the entire structure is represented, it can be stopped at a given depth (usually 8).
3. If a substructure is present in a chemical, the corresponding sets of bits in the fingerprint are set to 1. In other words, each substructure corresponds to a partial fingerprint and the total fingerprint is constructed by logically summing them.

Molecular fingerprints can be used to measure the similarity between different chemicals utilizing the Tanimoto Coefficient. The similarity between two fingerprints A and B is calculated to be:

$$\frac{c}{a+b-c} \quad (5)$$

where a and b are the number of 1s in A and B, respectively, and c is the number of 1s common to both fingerprints. Such a measure clearly provides a very simple picture of the similarity relationships between pair of structures, and is computationally efficient. Further, such a similarity measure has been found to be effective in that molecules that have been judged to be structurally similar by chemists have also found to be similar by this metric.

Previous research has been conducted in the analysis of co-citations to determine related documents in bibliometrics. The notion is that if a first document cites both second and third documents, then the second and third documents are related. This technique has been adapted to find related pages in the World-wide Web, as discussed in "*Life, Death and Lawfulness on the Electronic Frontier*", J. Pitkow et al., Proceedings of the ACM SIGCHI '97 Conference on Human Factors in Computing Systems, pages 383-390, Atlanta, Ga., March 1997, and "*Finding Related Pages in the World-Wide Web*", J. Dean et al., Proceedings of the Eight International World-Wide Web Conference, Toronto, Canada, May 1999.

Disclosed herein is a method for determining the similarity between multiple documents. Such documents can include, but are not restricted to, patent documents. The method utilizes a plurality of similarity measures to determine the overall similarity between the documents. One measure relates to common terms that occur in the documents under consideration. Another measure relates to common references between the documents under consideration. A further measure relates to the premise that documents containing similar terms should be considered similar. Instead of only determining matching keywords in the documents, the method determines the semantic similarity between terms in the documents by utilizing a domain-specific ontology. For example, terms which are synonyms (based on the ontology) are considered to be equivalent.

When considering chemical, biochemical or pharmaceutical patent documents, the similarity between two or more patent documents can also be determined based on the structural similarity among molecules described in those patent documents, since similar molecules tend to behave similarly.

In one embodiment, the similarity between two chemicals is determined based on the number of common substructures between those two chemicals.

A preferred embodiment utilizes a modified Vector Space model in which the documents are represented by the terms contained therein. The terms can be, for example, English words or biological concepts. In a further embodiment, the terms exclude "stop words", which are common words that are ignored when searching a key phrase. The exclusion of such "stop words" accelerates the searching process.

FIG. 1 is a flow diagram of a method 100 for determining a semantic similarity measure for biomedical patent documents, in accordance with the present disclosure. The method 100 begins at a Start step 110 and proceeds to step 120, which identifies biological terms within the documents that are to be compared. The biological terms are typically identified with reference to one or more appropriate technical dictionaries and/or ontologies. Control passes to step 130, which identifies chemical terms in the documents that are to be compared. The chemical terms are typically identified with reference to a set of rules. In one embodiment, the method identifies chemical terms by comparing terms within the documents with a predefined dictionary of chemical names and utilising a customisable rule engine. An example of a rule used to identify chemical terms is that a string containing "methyl" is a chemical.

Control passes to step 140, which determines the similarity of the biological terms identified in step 120. Then step 150 determines the similarity of the chemical terms identified in step 130. Control passes to step 160 to determine the semantic similarity between the documents under consideration, based on the similarities of the biological terms and chemical terms identified in steps 140 and 150. Determining the similarity of the documents will be discussed in greater detail below. Control then passes to an End step 170 and the method terminates. It will be appreciated and readily understood by a person skilled in the relevant art that one or more steps of the method 100 can be practised in a different order, or in parallel, without departing from the spirit and scope of the present invention.

Figure 2:
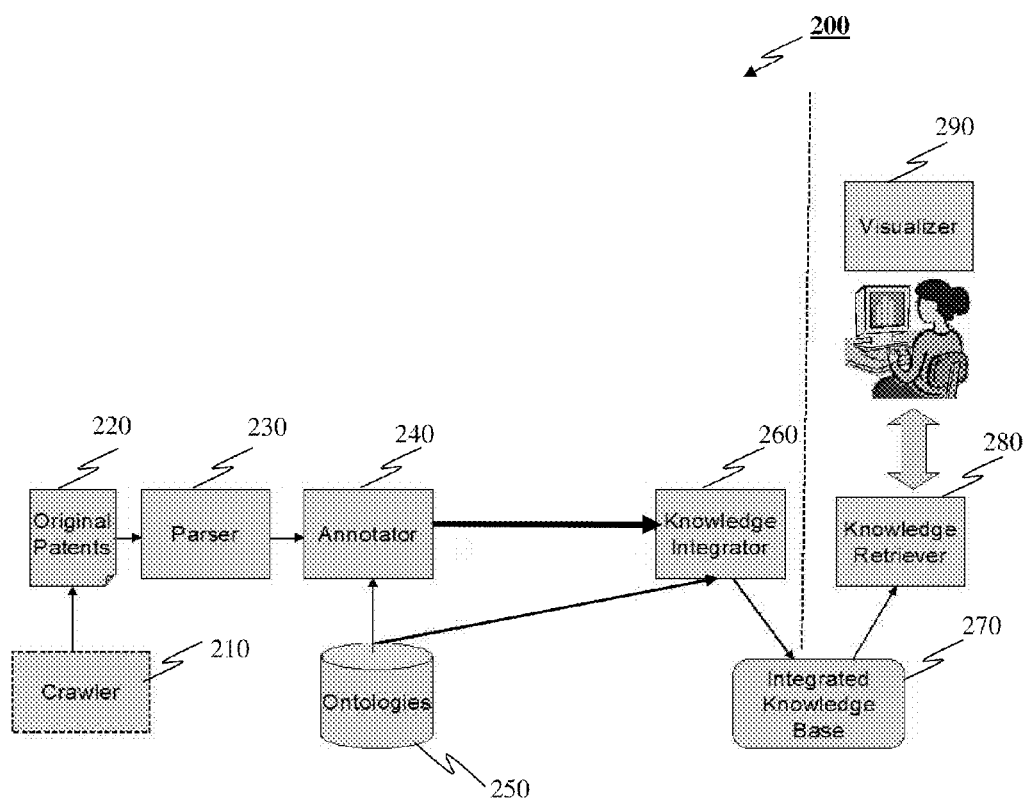
FIG. 2 is a schematic block diagram illustrating a system architecture of a BioPatentMiner system.

BioPatentMiner is a system to facilitate knowledge discovery from patents related to biomedicine. FIG. 2 is a schematic block diagram illustrating the overall architecture of an embodiment of the BioPatentMiner system 200. The system 200 uses a crawler 210 to download patents 220 from an online patent database, such as provided by the United States Patent and Trademark Office (USPTO), based on a query input by a user. The system 200 can be also used on a collection of biomedical patents obtained by other techniques. A parser 230 parses these patents 220 to extract information. Such information may include, for example, inventors, assignees, titles, and abstracts. In one embodiment, the parser 230 assumes that the patents 220 are in the HyperText Markup Language (HTML) format of the USPTO site. Other embodiments of the system 200 are adjusted to handle documents in other formats.

Biological terms in the parsed files are passed from the parser 230 to an annotator 240. The annotator 240 annotates the parsed files, using for example a BioAnnotator system as described in "Information Extraction from Biomedical Literature: Methodology, Evaluation and an Application", L. Subramaniam et al., Proceedings of the ACM Conference on Information and Knowledge Management, New Orleans, La., 2003. BioAnnotator identifies and classifies biological terms in scientific text by utilizing publicly available biomedical ontologies 250 that are presented as an input to the annotator 240.

The annotated patents are passed from the annotator 240 to be indexed by an integrator/indexer 260, such as an XML search engine. The integrator/indexer 260 also receives as an input the ontologies 250, and passes the integrated information from the patents and the ontologies to an integrated knowledge database 270. Information contained in the integrated knowledge database 270 can be retrieved using a knowledge retriever 280. The knowledge retriever presents information from the integrated knowledge database 270 requested by a user on a display system, such as a visualizer 290. Further information pertaining to the BioPatentMiner system 200 is contained in "*BioPatentMiner: An Information Retrieval System for BioMedical Patents*", S. Mukherjea et al., Proceedings of the Very Large Databases (VLDB) Conference, Toronto, Canada, 2004.

Description of Embodiments

The present disclosure provides a method for determining the similarity of two or more publications based on multiple similarity measures determined for those publications. The method identifies technical terms in documents under consideration and determines the similarity of those documents based on at least two semantic, structural and reference similarity measures. When seeking to compare documents from a particular domain, a domain-specific ontology is utilised to determine the semantic similarity between the publications. Such domains can include, for example, computer science, chemistry, and biochemistry.

In an embodiment concerned with comparing documents in the biochemical domain, the ontology stores all related synonyms for each biological concept. In a further embodiment concerned with chemical, biological and pharmaceutical documents, chemical formulas in the publications under consideration are compared based on common substructures contained therein.

In the following example, an embodiment of the present disclosure determines the similarity of two given documents and returns a similarity value Sim(Pi, Pj) in the range 0.0 to 1.0, in which a value of 1.0 indicates that the documents are identical. In this embodiment, the similarity value is determined by a semantic similarity measure and a reference similarity measure. The similarity value is defined as:

$$Sim(P_i,P_j) = WTref \times RefSim(P_i,P_j) + (1-WT_{ref}) \times SemSim(P_i,P_j) \qquad (6)$$

The Reference Similarity component, $RefSim(P_i, P_j)$, calculates the similarity of the documents based on references contained within the documents, and will be discussed in further detail below. The Semantic Similarity component, SemSim(Pi, Pj), calculates the similarity of the documents based on the contents of the documents, as also explained in further detail below. The final similarity component is a linear combination of the two similarity measures. $WT_{ref}$ is a pre-defined constant determining the weight given to the Reference Similarity during the final similarity calculation. In one embodiment, the weighting term is set to 0.5, so that equal importance is given to each of the Reference and Semantic similarity components. The value of the weighting term can be varied for specific applications, to place greater or lesser importance on the commonality of references shared by the documents or the semantic similarity of the documents.

Figure 3:
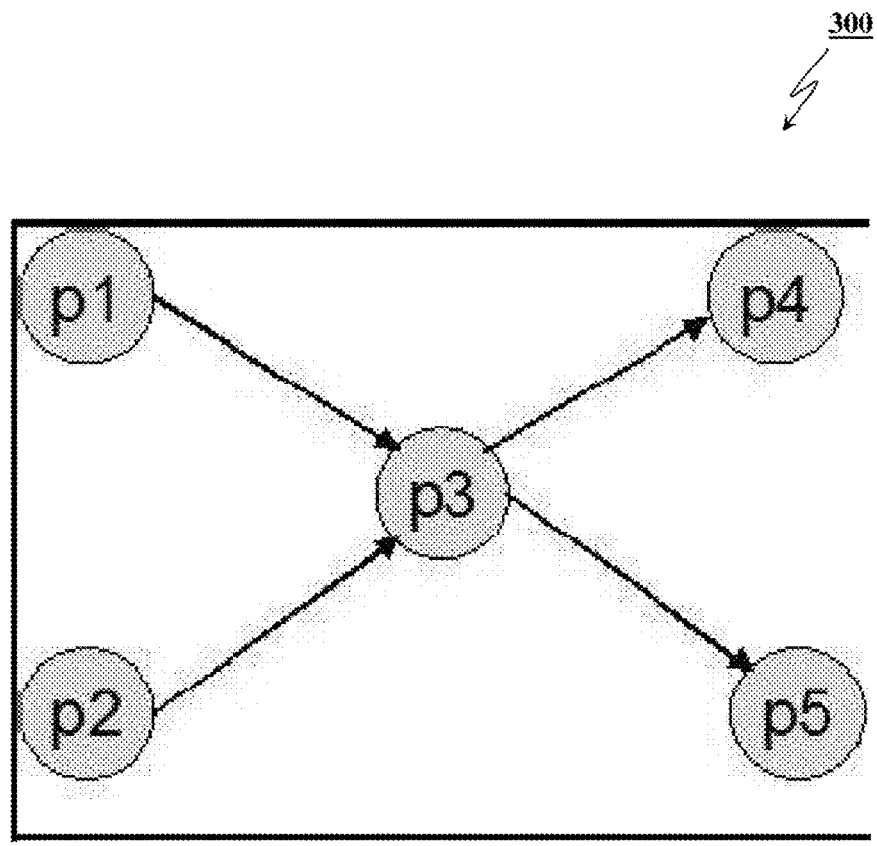
FIG. 3 is a Reference Graph illustrating the reference similarity between documents.

The Reference similarity of the documents is determined in this embodiment by utilizing a Reference graph. The documents are the nodes of this graph. If a document $P_i$ contains a reference to a document $P_j$, a direct edge is created between the corresponding nodes. FIG. 3 shows an example of such a Reference Graph 300, in which pi corresponds to document $P_i$. In the example shown in FIG. 3, a direct edge links nodes p1 and p3, which indicates that document P1 is related to document P3. As the edge is drawn from p1 to p3, document P1 contains a reference to document P3. Node p2 also has a direct edge to p3, indicating that document P2 also contains a reference to document P3. As each of documents P1 and P2 contains a reference to document P3, it is likely that documents P1 and P2 are related. Further, node p3 has direct edges to each of nodes p4 and p5, indicating that document P3 contains references to each of documents P4 and P5. Accordingly, documents P4 and P5 are considered to be similar.

Based on the above observations from the Reference Graph 300 in FIG. 3, if there is a directed or undirected path between any two nodes of a Reference graph, the corresponding documents are considered to be similar, with the degree of similarity inversely proportional to the length of the path between the two nodes. Thus, the Reference Similarity between two documents $P_i$ and $P_j$ is calculated to be the inverse of the minimum path length between corresponding nodes pi and pj in the Reference graph. Thus, $$RefSim(P_i, P_j) = \frac{1}{MinPathLen(pi, pj)} \qquad (7)$$

If there are no paths between two nodes, the Reference Similarity of the corresponding documents is 0. For the example Reference graph 300 shown in FIG. 3, the minimum path length between p1 and p3 is 1. Therefore, the Reference similarity between these patents, $RefSim(P1,P_3)$, will also be 1. On the other hand, the minimum path length between p1 and p2, as well as p1 and p4, is 2. Therefore, the Reference Similarity between the corresponding patents is 0.5, as $RefSim(P_1,P_2)=\frac{1}{2}$ and $RefSim(P_1,P4)=\frac{1}{2}$.

In order to determine the semantic similarity between two documents, $SemSim(P_i,P_j)$, this embodiment utilizes an augmented Cosine Similarity method to compare documents based on the contents of those documents. The documents are represented by vectors containing the terms contain therein. The terms can be English words or terms belonging to a domain-specific ontology. In one embodiment, the terms exclude "stop words", which are common words that are ignored when searching a key phrase. While comparing the terms in the documents, the semantic similarity between the documents is determined by utilizing a domain-specific ontology.

Even if two terms are not equal, those terms can be semantically similar if the terms are synonyms or if the terms belong to the same ontology class. If the terms belong to different classes, the similarity between the classes will determine the similarity between the terms. Moreover, in the case in which pharmaceutical patent documents are being compared, if both the terms are molecules represented by chemical formulae, the structural similarity between the molecules is determined and may be incorporated into the semantic similarity measure.

In one embodiment, a domain-specific ontology is utilized that contains various terms as well as all synonyms for those terms. Further, each term belongs to an Ontology class. The classes form an ISA-hierarchy in which a class can be a child of another class. Initially, the similarity between all pairs of the ontology classes is pre-computed using Lin's method, as described above with reference to equation (4), to determine sim(Ck, Cl):

$$sim(Ck, Cl) = \frac{2 \times [\ln(p_{\min})]}{\ln(p_{Ck}) + \ln(p_{Cl})} \quad (8)$$

where $p_{Ck}$ is the probability of encountering the class Ck or a child of the term in the taxonomy, and $p_{min}$ is the minimum probability among their common ancestors.

The Semantic Similarity between two documents Pi and Pj represented by vectors di and dj is then given by the Cosine Similarity between the vectors, as described above with reference to equation (2), calculated as:

$$SemSim(P_i, P_j) = \frac{d_i \cdot d_j}{\sqrt{d_i \cdot d_i} \sqrt{d_j \cdot d_j}} \quad (9)$$

where $d_i \cdot d_j$ is the dot product between the vectors, calculated as $$\sum_{k=0}^{n}\sum_{l=0}^{n} w_{ik} \cdot w_{jl} \quad (10)$$

The method disclosed herein for calculating the dot product differs from traditional techniques. For terms k and l in documents i and j respectively, $w_{ik} \cdot w_{jl}$ can be calculated in various ways:

1. If terms k and l are the same, or represent the same concept, $w_{ik} \cdot w_{jl}$ is calculated to be:

$$tf_{ik} \times \log_2 \frac{N}{n_k} \times tf_{jl} * \log_2 \frac{N}{n_l} \quad (11)$$

which is the traditional TF-IDF measure, as described above with reference to equation (1). The weight of a term is determined by the frequency of the term in the document, as well as how common the term is in the document corpus.

2. If k and l belong to the Ontology classes Ck and Cl, respectively, $w_{ik} \cdot w_{jl}$ is calculated to be:

$$tf_{ik} \times tf_{jl} \times idf(Ck) \times idf(Cl) \times sim(Ck,Cl) \times WT_{Ont} \quad (12)$$

For calculating the contribution of dissimilar terms to the overall similarity between two documents, the following factors are considered:
(a) The frequencies of the terms in the patents.
(b) idf(C) represents the inverse document frequency of class C in the corpus and is calculated as:

$$\log_2 \frac{N}{n_C} \quad (13)$$

where N is number of documents in a collection and $n_c$ is the number of documents in which a term of Class C occurs at least once. The method utilizes this metric in such a way that common classes are allocated a lower weight.
(c) The similarity between the classes to which the terms belong. The similarity value sim(Ck,Cl) varies between 0, when the common ancestor of the classes is the root of the ontology hierarchy, and 1, when Ck and Cl are the same.
(d) $WT_{ont}$ is a predefined constant between 0 and 1 that determines the relative importance allocated to Ontology-based similarity when determining the overall similarity of documents. If the constant is set to 0, the results are equivalent to traditional cosine similarity, as described above with reference to equation (2). Preferably, the constant is set to be less than 1, so that if two terms are not equivalent, but belong to the same class, those terms are given less weight. In one embodiment, the constant is set to 0.6, as a result of experimentation with some patent collections.

Pharmaceutical patents typically contain many chemical formulas representing different molecules. When utilizing the ontology, all chemicals are treated similarly, since all chemicals belong to the same class. However, it is desirable to determine the similarity between documents based on the structural similarity between the chemicals contained in the documents. Therefore, in equation (12) above, if k and l are both chemicals, $w_{ik} \cdot w_{jl}$ is calculated to be:

$$tf_{ik} \times tf_{jl} \times idf(Chemical)^2 \times simChemical(k,l) \times WT_{Chem} \quad (14)$$

where idf(Chemical) is the Inverse Document Frequency of the Chemical class. simChemical(k,l) determines the similarity between the chemicals k and l. The similarity is calculated by the Tanimoto coefficient of the Molecular fingerprints of the chemicals, as discussed above with reference to equation (5). $WT_{chem}$ is a predefined constant between 0 and 1, that determines how much importance is given to Chemical-based similarity. In one embodiment, $WT_{chem}$ is set to 0.5.

Figure 4:
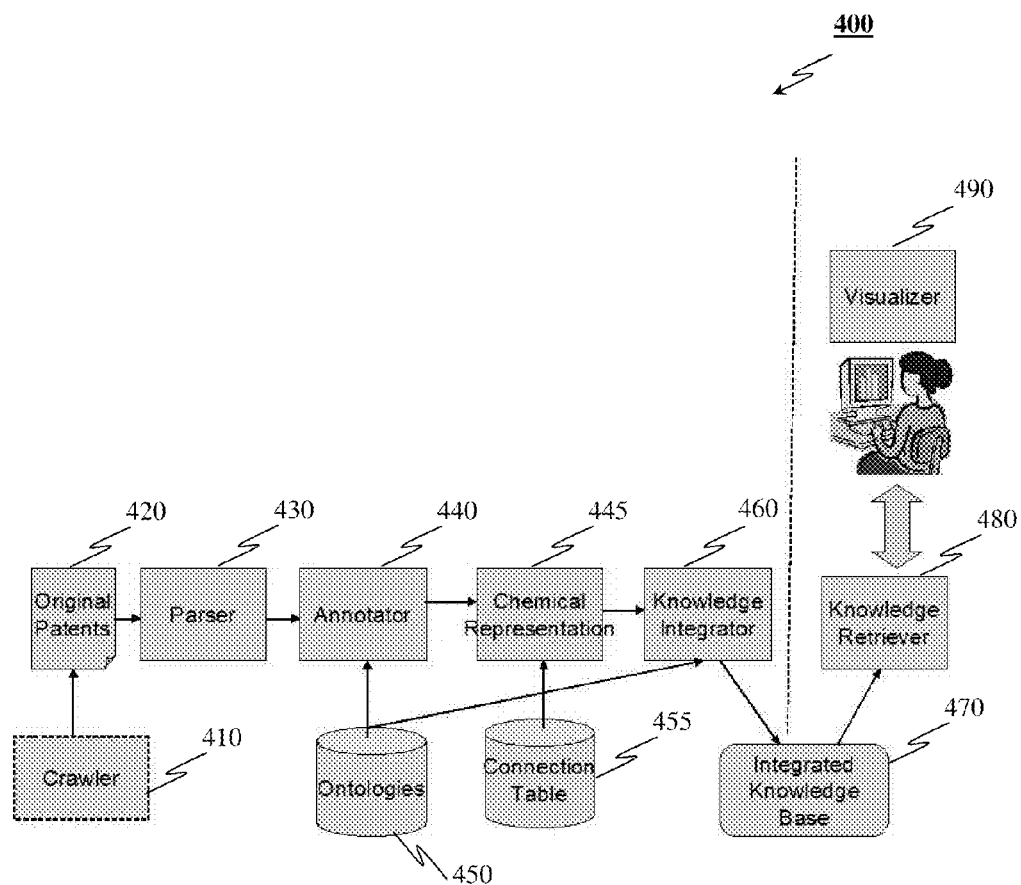
FIG. 4 is a schematic block diagram illustrating a system architecture of an BioPatentMiner system incorporating an embodiment of the present disclosure.

As described above, BioPatentMiner is a system to facilitate knowledge discovery from patents related to biomedicine. FIG. 4 is a schematic block diagram illustrating the overall architecture of a BioPatentMiner system 400 enhanced in accordance with an embodiment of the present invention. The system 400 uses a crawler 410 to download patents 420 from an online patent database, such as provided by the United States Patent and Trademark Office (USPTO), based on a query input by a user. The system 400 can be also used on a collection of biomedical patents obtained by other techniques. A parser 430 parses these patents 420 to extract information. Such information may include, for example, inventors, assignees, titles, and abstracts. In one embodiment, the parser 430 assumes that the patents 420 are in the Hyper-Text Markup Language (HTML) format of the USPTO site. Other embodiments of the system 400 are adjusted to handle documents in other formats.

Biological terms in the parsed files are passed from the parser 430 to an annotator 440. The annotator 440 annotates the parsed files, using for example a BioAnnotator system as described in "*Information Extraction from Biomedical Literature: Methodology, Evaluation and an Application*", L. Subramaniam et al., Proceedings of the ACM Conference on Information and Knowledge Management, New Orleans, La., 2003. BioAnnotator identifies and classifies biological terms in scientific text by utilizing publicly available biomedical ontologies 450 that are presented as an input to the annotator 440. BioAnnotator also uses a Rule Engine to identify unknown and new chemical formulae that are not present in the ontologies.

In one embodiment, the biomedical ontology used by the BioAnnotator is Unified Medical Language System (UMLS), as described at the URL http://umlsks.nlm.nih.gov. UMLS is a consolidated repository of medical terms and their relationships, spread across multiple languages and disciplines. Such disciplines include, for example, chemistry and biology. One section of UMLS is a Semantic Network that includes 235 biomedical semantic classes like Gene or Genome, and Amino Acid, Peptide, or Protein. In addition, the Semantic Network includes biological concepts, each of which is associated with one or more semantic classes. For example, the concept caspase 3 is associated with the semantic class Amino Acid, Peptide or Protein. A biological concept can be referred to by various synonyms. For example, caspase 3 is variously referred to using the terms apopain, Yama protein, and CPP32 protein. UMLS identifies one of the synonyms as the primary name of the concept and BioAnnotator annotates each identified biological term with an associated primary name (or baseform) and semantic class.

For the chemicals identified by BioAnnotator in the documents under consideration, the baseform is the Molecular fingerprint representation of the chemical and the class is Chemical. The Molecular fingerprint is derived using a connection table, which contains a list of all the atoms within a chemical structure, together with bond information that describes the exact manner in which the individual atoms are linked together. Examples of such connection tables are available, for example, at Chemical Abstracts Service (CAS Online) cas.org.

A Reference graph is created based on the references of the documents. In addition, to facilitate knowledge discovery the system integrates the information of the patents and biomedical ontologies. The integrated Patent Knowledge base enables several types of information retrieval. Besides keyword search, the system allows the user to search for patents containing a class of biomedical concept. Moreover, a user can identify semantic relationships between patent documents, inventors, and assignees, for example, as well as biomedical concepts.

In this embodiment, the annotated patents are represented in the eXtensible Markup Language (XML) and are passed through a chemical representation block 445 to be indexed by an integrator/indexer 460, such as an XML search engine. The chemical representation block receives as inputs the annotated patents from the annotator 440, and a connection table 455. The connection table 455 is used to create Molecular Fingerprints for the chemicals identified in the annotated patent. In order to facilitate knowledge discovery, the system integrates the information of the patents and biomedical ontologies. Thus, the integrator/indexer 460 receives the ontologies 450 and patents from the chemical representation block 445 as inputs and passes the integrated information from the patents and the ontologies to an integrated knowledge database 470.

Information contained in the integrated knowledge database 470 can be retrieved using a knowledge retriever 480. The integrated information space provided by the integrated knowledge base 470 facilitates several types of information retrieval. Besides keyword search, the system allows the user to search for patents containing a class of biomedical concept. Further, it is possible to identify semantic relationships between patents, inventors, assignees, and biomedical concepts. The knowledge retriever presents information from the integrated knowledge database 470 requested by a user on a display system, such as a visualizer 490, as will be described below with reference to FIG. 5. Thus, the embodiment of FIG. 4 performs the functions of a semantic search, a semantic association, and a similarity search to identify similar documents.

TABLE 1

| Patents | Common Terms |
| --- | --- |
| Ranbaxy: Azole compounds as therapeutic agents for fungal infections [6670363] Pfizer: Bicycliccarbonyl indole compounds as anti-inflammatory/analgesic agents [6303628] | sulfur, phenyl, hydroxy, composition, trifluoromethyl, oxygen, hydrogen, halogens, salts |
| Ranbaxy: Azole compounds as therapeutic agents for fungal infections [6670363] Pfizer: Heteroaryl phenyl pyrazole compounds as anti-inflammatory/analgesic agents [6649636] | mammals, phenyl, hydroxy, composition, trifluoromethyl, hydrogen, salts, formyl, furyl, oxazolyl |
| Ranbaxy: Azole compounds as therapeutic agents for fungal infections [6670363] Pfizer: 3-Azabicyclo[3.1.0]hexane derivatives useful in therapy [6313312] | phenyl, cobalt, alkyl, naphthyl, hydorxy, composition, imidazolyl, trifluoromethyl, hydrogen, morphlinyl, salts, furyl, oxazolyl, aryl |
| Ranbaxy: Azole compounds as therapeutic agents for fungal infections [6670363] Pfizer: Steroidal glycosides [5698526] | mammals, phenyl, thienyl, hydroxy, composition, imidazolyl, trifluoromethyl, hydrogen, morpholinyl, salts, furyl, oxazolyl, aryl |
| Ranbaxy: Extended release formulation of etodolca [6586005] Pfizer: Rapidly releasing and taste-masking pharmaceutical dosage form [6221402] | solutions, dosage forms, hydroxypropylcellulose. |
| Ranbaxy: Azole compounds as therapeutic agents for fungal infections [6670363] Pfizer: Sulfonylbenzene compounds as anti-inflammatory/analgesic agents [6294558] | sulfur, mammals, thienyl, hydroxy, composition, imidazolyl, trifluoromethyl, oxygen, hydrogen, salts, furyl, triazolyl, oxazolyl, atom, carboxyl, aryl |
| Ranbaxy: Derivatives of monosaccharides as cell adhesion inhibitors [6329344] Pfizer: Pharmaceutically active compounds [6586439] | cobalt, salts, prodrugs, aryl |

For each document retrieved from a database by a search, it is possible to determine documents that are similar. Further, it is possible to identify documents that are similar between two companies. For example, Table 1 shows similar patent documents between two companies Ranbaxy and Pfizer. The titles of the patents and the patent numbers are shown in a first column, and the common biological terms between the patents are shown in a second column. This type of analysis is a particularly useful aid for companies to identify potential patent infringements. It is also possible to identify patent documents that are similar to a nominal patent or patent application.

Figure 5:
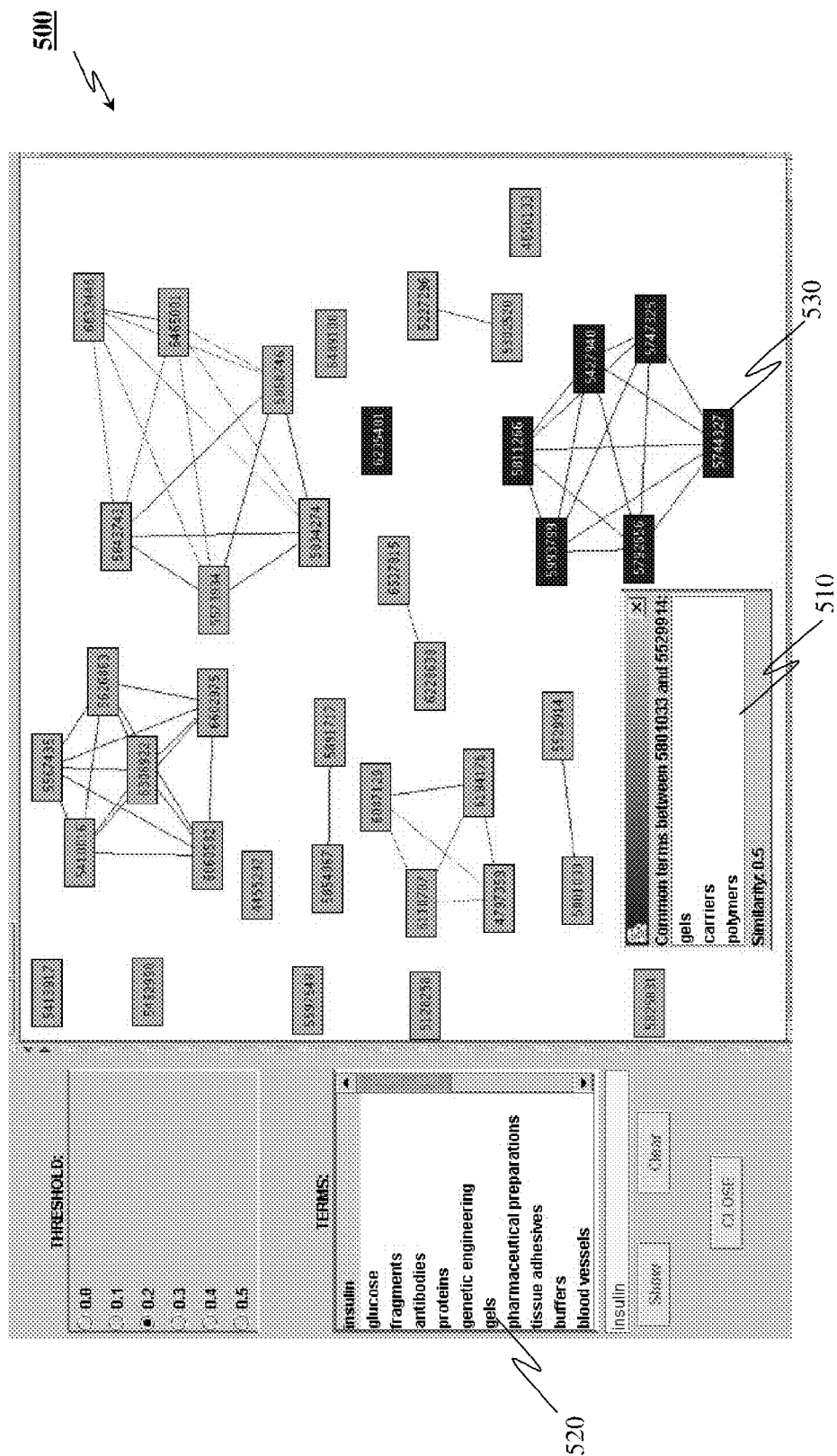
FIG. 5 is a screenshot capture from a visualizer 490 of FIG. 4.

It is possible to visualize the similarity between a collection of patents using the visualizer, which is a client side swing-based Java WebStart application. For example, FIG. 5 is a screenshot 500 showing a visualization of the similarity of a collection of patents that are assigned to University of Texas, as obtained from the USPTO site using the keyword "glycolysis". The input patents are shown as the nodes of a graph. If the similarity between two patents is greater than a predetermined similarity threshold, an edge is drawn between the nodes (patents). The similarity threshold is set by default to a value of 0.1, but can be readily modified by a user, as desired.

In the particular example shown in FIG. 5, a similarity threshold of 0.2 is utilized. At a similarity threshold of 0.2, some patents are not related to any other patents, while some other patents form clusters. Obviously, if the threshold is increased, many of the edges will disappear, and at a lower threshold more patents will be related. In this embodiment, the brightness of an edge linking two nodes is proportional to the similarity between the two patents connected by that edge. Clicking on an edge shows the terms common among the patents. For example, the terms common between U.S. Pat. Nos. 5,801,033 and 5,529,914 are shown in a popup window 410, which indicates that the common terms are gels, carriers, and polymers.

The main terms associated with the given group of patents are shown in a scrolled list 520 on the left side of the display. Thus, FIG. 5 shows that terms like insulin, glucose and antibodies are associated with the given set of patents. The user can select a term from the list 520 to see the patents that refer to that term. In the example shown in FIG. 5, the term "insulin" is selected in the list 520, which results in the patents that contain the term "insulin" being highlighted. It can be seen that many of these highlighted patents are similar and form a cluster 530.

United States patents are manually classified, so that each patent is categorized into one or more classes. The classification of patent documents facilitates searching of related documents. In one experiment, the USPTO internet site was queried to download patents from four classes. In particular, 500 patents were downloaded from each of the following classes:

1. Class 156: Adhesive Bonding and Miscellaneous Chemical Manufacture;
2. Class 181: Acoustics;
3. Class 424: Drug, Bio-Affecting and Body Treating Compositions; and
4. Class 514: Drug, Bio-Affecting and Body Treating Compositions.

The patents were annotated using BioAnnotator to identify biomedical concepts and chemical formulas. The chemicals were then converted to their Molecular fingerprints. The ontology used was UMLS. It is to be noted that the first two classes are not related to pharmacy or biomedicine. However, since UMLS is spread across multiple disciplines, including Chemistry, many concepts were also identified utilizing UMLS in patents of these first two classes.

The similarity between UMLS classes was pre-computed. Two classes are considered to be similar if those classes have a common ancestor with large information content. Thus, Molecular Function and Organism Function are found to be similar with a common ancestor Physiologic Function. Therefore, terms that belong to these two classes will have some similarity as well.

In order to establish the effectiveness of the method disclosed herein, a comparison was made with results obtained from the traditional Vector-space TF-IDF Cosine-similarity method of determining similarity. The pair-wise patent similarity was computed using the two techniques for patents within the same USPTO class, as well as patents in different USPTO classes. If the similarity between two patents was greater than a nominal threshold, the patents were deemed to be similar.

TABLE 2

| Similarity | Threshold | CosSim | Comparison Using Semantic and Structural Similarity Measures | Increase |
|---|---|---|---|---|
| Inter-class (181 vs 514) | 0.1 | 0.3 | 0.28 | −0.02 |
|  | 0.2 | 0.04 | 0.02 | −0.02 |
| Intra-class (181) | 0.1 | 10.74 | 11.82 | 1.08 |
|  | 0.2 | 6.88 | 7.58 | 0.7 |
| Intra-class (514) | 0.1 | 6.8 | 14.4 | 7.6 |
|  | 0.2 | 1.76 | 4.21 | 2.45 |
| Inter-class (156 vs 424) | 0.1 | 2.24 | 2.22 | −0.02 |
|  | 0.2 | 0.78 | 0.77 | −0.01 |
| Intra-class (156) | 0.1 | 9.22 | 9.89 | 0.67 |
|  | 0.2 | 5.04 | 5.42 | 0.38 |
| Intra-class (424) | 0.1 | 3.48 | 6.35 | 2.87 |
|  | 0.2 | 1.04 | 2.31 | 1.27 |
| Inter-class (424 vs 514) | 0.1 | 1.8 | 3.52 | 1.72 |
|  | 0.2 | 0.45 | 0.93 | 0.48 |
| Intra-class (424) | 0.1 | 3.48 | 6.35 | 2.87 |
|  | 0.2 | 1.04 | 2.31 | 1.27 |
| Intra-class (514) | 0.1 | 6.8 | 14.4 | 7.6 |
|  | 0.2 | 1.76 | 4.21 | 2.45 |

Table 2 shows the percentage of patents found to be similar using the two techniques. To emphasize that the evaluation is not biased by the value of the threshold, two values for the constant were used, 0.1 and 0.2. It is assumed that, in general, patents in the same USPTO class are similar to each other and dissimilar to patents of other classes. Table 2 shows that for dissimilar patents (in different classes), the number of patents found to be similar by the method disclosed herein is slightly larger, or even smaller, than the number of patents found to be similar by the old technique. Thus, when comparing patents of class 156 and 514, 0.3% of the patents were found similar by the old technique and 0.28% of the patents were found similar by the method disclosed herein at a threshold of 0.1.

However, for similar patents (in the same class) a larger number of patents were found to be similar by the method disclosed herein. This was particularly the case for pharmaceutical patents belonging to classes 424 and 514. Thus, at a threshold of 0.1, by Cosine Similarity 6.8% of the patents in class 514 were found to be similar, while by the method disclosed herein 14.4% of the patents were found to be similar.

These statistics indicate that the method disclosed herein calculates a higher similarity value for similar patents, but not for dissimilar patents. The intra-class similarity calculated by the method disclosed herein will generally be greater than the similarity between the patents as calculated by Cosine Similarity, since the method disclosed herein augments Cosine Similarity by considering the Semantic and Structural similarity between terms, even if the terms are not equal. Moreover, the method disclosed herein calculates the Reference similarity, and generally there are references between patents of the same USPTO class.

It is noted that patents of both classes 514 and 424 are pharmaceutical and are thus related. However, patents within the same class are obviously more related. Table 2 shows that, in this case, the increase in the number of similar patents was higher during intra-class comparison than during inter-class comparison. Thus, the method disclosed herein is also effective in identifying the most similar patents to a query patent in a collection of related Pharmaceutical patents.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

Figure 6:
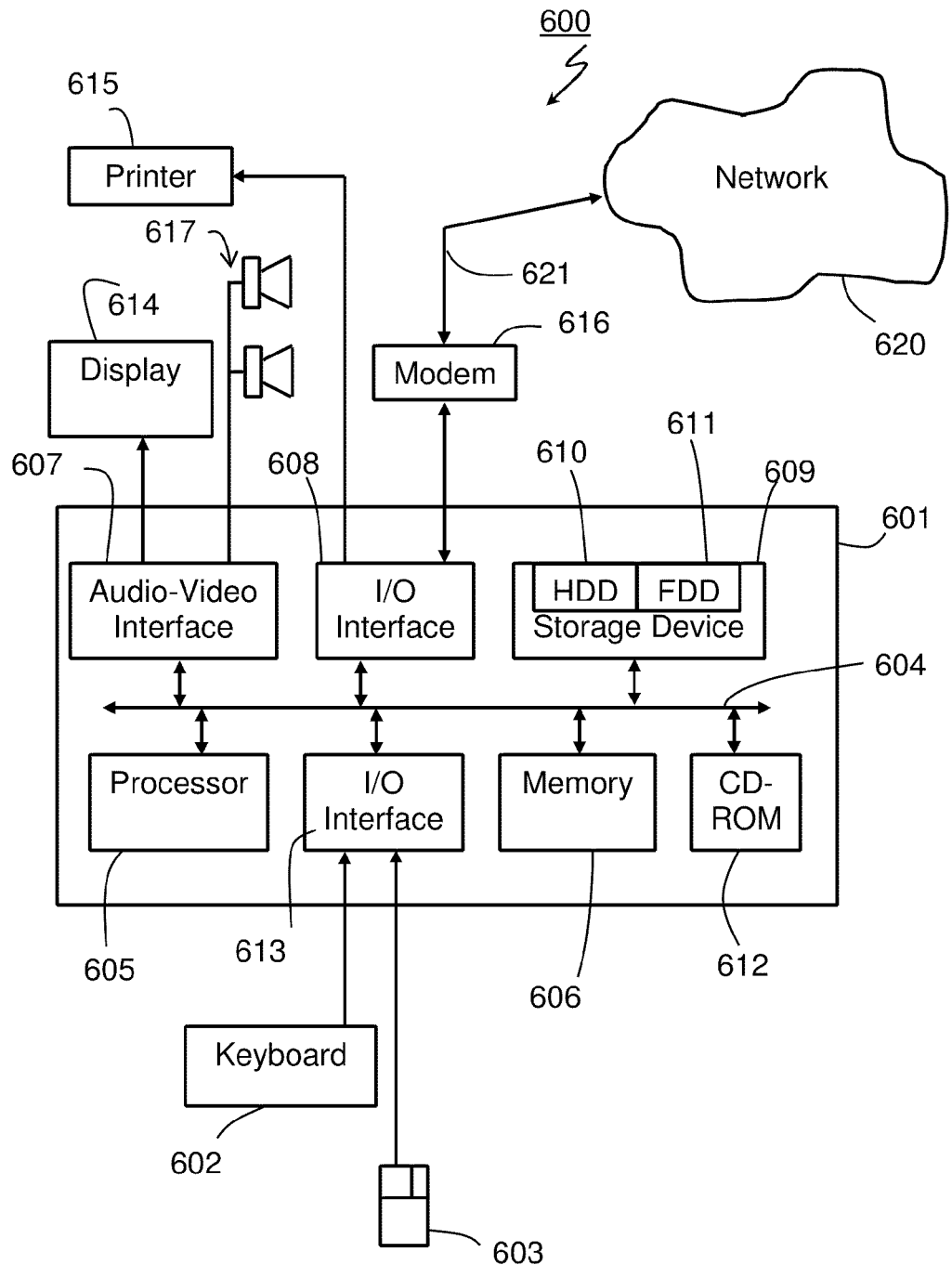
FIG. 6 is a schematic block diagram of a general purpose computer upon which arrangements described can be practised.

The method of comparing documents is preferably practised using a general-purpose computer system 600, such as that shown in FIG. 6 wherein the processes described above may be implemented as software, such as an application program executing within the computer system 600. In particular, the steps of the method of comparing documents are effected by instructions in the software that are carried out by the computer. The instructions may be formed as one or more code modules, each for performing one or more particular tasks. The software may also be divided into two separate parts, in which a first part performs the document comparison methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for comparing documents.

The computer system 600 is formed by a computer module 601, input devices such as a keyboard 602 and mouse 603, output devices including a printer 615, a display device 614 and loudspeakers 617. A Modulator-Demodulator (Modem) transceiver device 616 is used by the computer module 601 for communicating to and from a communications network 620, for example connectable via a telephone line 621 or other functional medium. The modem 616 can be used to obtain access to the Internet, and other network systems, such as a Local Area Network (LAN) or a Wide Area Network (WAN), and may be incorporated into the computer module 601 in some implementations.

The computer module 601 typically includes at least one processor unit 605, and a memory unit 606, for example formed from semiconductor random access memory (RAM) and read only memory (ROM). The module 601 also includes an number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the modem 616 and printer 615. In some implementations, the modem 616 may be incorporated within the computer module 601, for example within the interface 608. A storage device 609 is provided and typically includes a hard disk drive 610 and a floppy disk drive 611. A magnetic tape drive (not illustrated) may also be used. A CD-ROM drive 612 is typically provided as a non-volatile source of data. The components 605 to 613 of the computer module 601, typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations or alike computer systems evolved therefrom.

Typically, the application program is resident on the hard disk drive 610 and read and controlled in its execution by the processor 605. Intermediate storage of the program and any data fetched from the network 620 may be accomplished using the semiconductor memory 606, possibly in concert with the hard disk drive 610. In some instances, the application program may be supplied to the user encoded on a CD-ROM or floppy disk and read via the corresponding drive 612 or 611, or alternatively may be read by the user from the network 620 via the modem device 616. Still further, the software can also be loaded into the computer system 600 from other computer readable media. The term "computer readable medium" as used herein refers to any storage or transmission medium that participates in providing instructions and/or data to the computer system 600 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of transmission media include radio or infrared transmission channels as well as a network connection to another computer or networked device, and the Internet or Intranets including e-mail transmissions and information recorded on Websites and the like.

The method of comparing documents may alternatively be implemented in dedicated hardware such as one or more integrated circuits performing the functions or sub functions of semantic similarity determination and structural similarity determination. Such dedicated hardware may include graphic processors, digital signal processors, or one or more microprocessors and associated memories.

INDUSTRIAL APPLICABILITY

It is apparent from the above that the arrangements described are applicable to the computer, data processing, and pharmaceutical industries.

The foregoing describes only some embodiments of the present invention, and modifications and/or changes can be made thereto without departing from the scope and spirit of the invention, the embodiments being illustrative and not restrictive.

We claim:

1. A method of comparing a plurality of documents, said method comprising:

determining a plurality of similarity measures for said plurality of documents; and determining an overall similarity measure for said plurality of documents, based on said plurality of similarity measures, wherein said plurality of similarity measures are chosen from the group of similarity measures comprising:

a semantic similarity measures based on similarity of terms contained in said plurality of documents;

a structural similarity measure based on the structures of chemical terms described in said plurality of documents; and a reference similarity measure based on references contained in said plurality of documents;

wherein said plurality of similarity measures include a semantic similarity measure and a reference similarity measure, and further wherein two documents $P_i$ and $P_j$ being compared are represented by corresponding vectors:

$d_i = \{w_{i1}, w_{i2}, \ldots, w_{in}\}$, where $w_{ik}$ ($1<k<n$) is a non-negative value denoting the weight of the term k in the document i, and $dj = \{wj_1, wj_2, \ldots, wj_n\}$, where $w_{il}$ ($1<l<n$) is a non-negative value denoting the weight of the term l in the document j, and the semantic similarity measure SemSim( ) is given by the equation:

$$SemSim(P_i, P_j) = \frac{d_i, d_j}{\sqrt{d_i \cdot d_i} \sqrt{d_j \cdot d_j}},$$

in which where $d_i \cdot dj$ is the dot product between the vectors, calculated as $\Sigma$(from k=0 to n)$\Sigma$(from l=0 to n) $w_{ik} \cdot w_{il}$;

and wherein if terms k and l belong to ontology classes Ck and Cl, respectively, $w_{ik} \cdot w_{il}$ is calculated as:

$tf_{ik} \times tf_{jl} \times idf(Ck) \times idf(Cl) \times sim(Ck, Cl) \times WT_{ont}$, wherein $tf_{ik}$ is the frequency of the term k in the document i, $tf_{jl}$ is the frequency of the term l in the document j, idf(Ck) represents the inverse document frequency of class Ck in document corpus of document i and is calculated as: $\log_2 (N/n_{Ck})$, where N is the number of documents in a collection, and $n_{Ck}$ is the number of documents in which a term of class Ck occurs at least once, idf(Cl) represents the inverse document frequency of class Cl in document corpus of document j and is calculated as: $\log_2 (N/n_{Cl})$, where N is the number of documents in a collection, and $n_{Cl}$ is the number of documents in which a term of class Cl occurs at least once, sim(Ck, Cl) is calculated as:

$$sim(Ck, Cl) = \frac{2 \times [\ln(p_{\min})]}{\ln(p_{Ck}) + \ln(p_{Cl})},$$

where $p_{Ck}$ is the probability of encountering the class Ck or a child of the term in a given taxonomy, $p_{Cl}$ is the probability of encountering the class Cl or a child of the term in a given taxonomy and $p_{min}$ is the minimum probability among common ancestors of classes Ck and Cl, and $WT_{ont}$ is a predefined constant in the range $0 < WT_{ont} < 1$.

2. The method according to claim 1, wherein said plurality of similarity measures include each of a semantic, a structural, and a reference similarity measure.

3. The method according to claim 1, further comprising: weighting the plurality of similarity measures to determine said overall similarity measure.

4. The method according to claim 1, wherein said documents being compared comprise chemical documents, and one of said similarity measures is a semantic similarity measure, wherein determination of said semantic similarity measure utilizes a determination of chemical structural similarity of said terms contained in said plurality of documents.

5. The method according to claim 4, wherein said terms contained in said plurality of documents are associated with chemical substructures represented as strings.

6. The method according to claim 1, wherein said reference similarity measure is determined utilizing a reference graph, each of said plurality of documents associated with a corresponding node in said reference graph, said reference similarity measure comprising the inverse of the minimum path length between nodes in the reference graph associated with said plurality of documents.

7. The method according to claim 1, wherein if terms k and l are the same, $w_{ik} \cdot w_{il}$ is calculated as:

$$tf_{ik} \times \log_2 \frac{N}{n_k} \times tf_{jl} \times \log_2 \frac{N}{n_l},$$

wherein $tf_{ik}$ is the frequency of the term k in the document i, $tf_{jl}$ is the frequency of the term l in the document j, N is the number of documents in a collection, $n_k$ is the number of documents in which the term k occurs at least once, and nl is the number of documents in which the term l occurs at least once.

8. The method according to claim 1, further comprising: determining said terms contained in said plurality of documents by utilizing at least one of an ontology, a taxonomy, and a dictionary.

9. A computer program product having a computer readable storage medium having a computer program recorded therein for comparing documents, said computer program product comprising a method comprising:

determining a plurality of similarity measures for said plurality of documents; and determining an overall similarity measure for said plurality of documents, based on said plurality of similarity measures, wherein said plurality of similarity measures are chosen from the group of similarity measures comprising:

a semantic similarity measures based on similarity of terms contained in said plurality of documents;

a structural similarity measure based on the structures of chemical terms described in said plurality of documents; and a reference similarity measure based on references contained in said plurality of documents;

wherein said plurality of similarity measures include a semantic similarity measure and a reference similarity measure, and further wherein two documents $P_i$ and $P_j$ being compared are represented by corresponding vectors:

$d_i = \{w_{i1}, w_{i2}, \ldots, w_{in}\}$, where $w_{ik}$ ($1 < k < n$) is a non-negative value denoting the weight of the term k in the document i, and $dj = \{wj_1, wj_2, \ldots, wj_n\}$, where $w_{il}$ ($1 < l < n$) is a non-negative value denoting the weight of the term l in the document j, and the semantic similarity measure SemSim( ) is given by the equation:

$SemSim(P_i, P_j) = (d_i \cdot d_j)/(\sqrt{(d_i \cdot d_j)} \sqrt{(d_j \cdot d_j)})$, in which where $d_i \cdot dj$ is the dot product between the vectors, calculated as $\Sigma$(from k=0 to n)$\Sigma$(from l=0 to n) $w_{ik} \cdot w_{il}$;

and wherein if terms k and l belong to ontology classes Ck and Cl, respectively, $w_{ik} \cdot w_{il}$ is calculated as:

$tf_{ik} \times tf_{jl} \times idf(Ck) \times idf(Cl) \times sim(Ck, Cl) \times WT_{ont}$, wherein $tf_{ik}$ is the frequency of the term k in the document i, $tf_{jl}$ is the frequency of the term l in the document j, idf(Ck) represents the inverse document frequency of class Ck in document corpus of document i and is calculated as:

$$\log_2 \frac{N}{n_{Ck}},$$

where N is the number of documents in a collection, and $n_{Ck}$ is the number of documents in which a term of class Ck occurs at least once, idf(Cl) represents the inverse document frequency of class Cl in document corpus of document j and is calculated as:

$$\log_2 \frac{N}{n_{Cl}},$$

where N is the number of documents in a collection, and $n_{Cl}$ is the number of documents in which a term of class Cl occurs at least once, sim(Ck, Cl) is calculated as: $\text{sim}(Ck, Cl) = (2 \times [\ln(p_{min})])/(\ln(p_{Ck}) + \ln(p_{Cl}))$, where $p_{Ck}$ is the probability of encountering the class Ck or a child of the term in a given taxonomy, $p_{Cl}$ is the probability of encountering the class Cl or a child of the term in a given taxonomy and $p_{min}$ is the minimum probability among common ancestors of classes Ck and Cl, and $WT_{ont}$ is a predefined constant in the range $0 < WT_{ont} < 1$.

\* \* \* \* \*